(12) United States Patent
Yamazaki

(10) Patent No.: US 11,912,880 B2
(45) Date of Patent: Feb. 27, 2024

(54) WHITE PIGMENT COMPOSITION AND RECORDED MATTER

(71) Applicant: Seiko Epson Corporation, Toyko (JP)

(72) Inventor: Soichi Yamazaki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 199 days.

(21) Appl. No.: 17/210,574

(22) Filed: Mar. 24, 2021

(65) Prior Publication Data

US 2021/0301164 A1   Sep. 30, 2021

(30) Foreign Application Priority Data

Mar. 25, 2020 (JP) ................. 2020-054690

(51) Int. Cl.
*C09D 11/322* (2014.01)
*C09D 11/107* (2014.01)
*C09D 11/037* (2014.01)

(52) U.S. Cl.
CPC .......... *C09D 11/322* (2013.01); *C09D 11/037* (2013.01); *C09D 11/107* (2013.01); *C01P 2004/64* (2013.01)

(58) Field of Classification Search
CPC . C01P 2004/64; C09D 11/322; C09D 11/107; C09D 11/037
See application file for complete search history.

(56) References Cited

U.S. PATENT DOCUMENTS

| | | | |
|---|---|---|---|
| 6,492,435 B1 | 12/2002 | Miyamoto et al. | |
| 7,419,255 B2 | 9/2008 | Kawaguchi et al. | |
| 2006/0275606 A1 | 12/2006 | Mizutani | |
| 2013/0066006 A1 | 3/2013 | Miyajima | |
| 2017/0022380 A1* | 1/2017 | Nakagawa | ........... C09D 11/033 |
| 2019/0194482 A1 | 6/2019 | Yamazaki et al. | |

FOREIGN PATENT DOCUMENTS

| | | | |
|---|---|---|---|
| CN | 108676414 | * | 10/2018 |
| EP | 0980900 | * | 2/2000 |
| JP | 2005-161583 A | | 6/2005 |
| JP | 2006-274214 A | | 10/2006 |
| JP | 2009-161654 A | | 7/2009 |
| JP | 2013-060513 A | | 4/2013 |
| JP | 2014-095058 A | | 5/2014 |
| JP | 2019-112602 A | | 7/2019 |
| WO | 98-050473 A1 | | 11/1998 |

OTHER PUBLICATIONS

Machine English translation of CN 108676414, Liu, Oct. 19, 2018.*

* cited by examiner

*Primary Examiner* — Patrick D Niland
(74) *Attorney, Agent, or Firm* — Harness, Dickey & Pierce, P.L.C.

(57) ABSTRACT

A white pigment composition contains titanium oxide having an average particle diameter $D_1$ of less than 100 nm; and hollow particles having an average particle diameter $D_2$ of 100 nm or more.

11 Claims, 1 Drawing Sheet

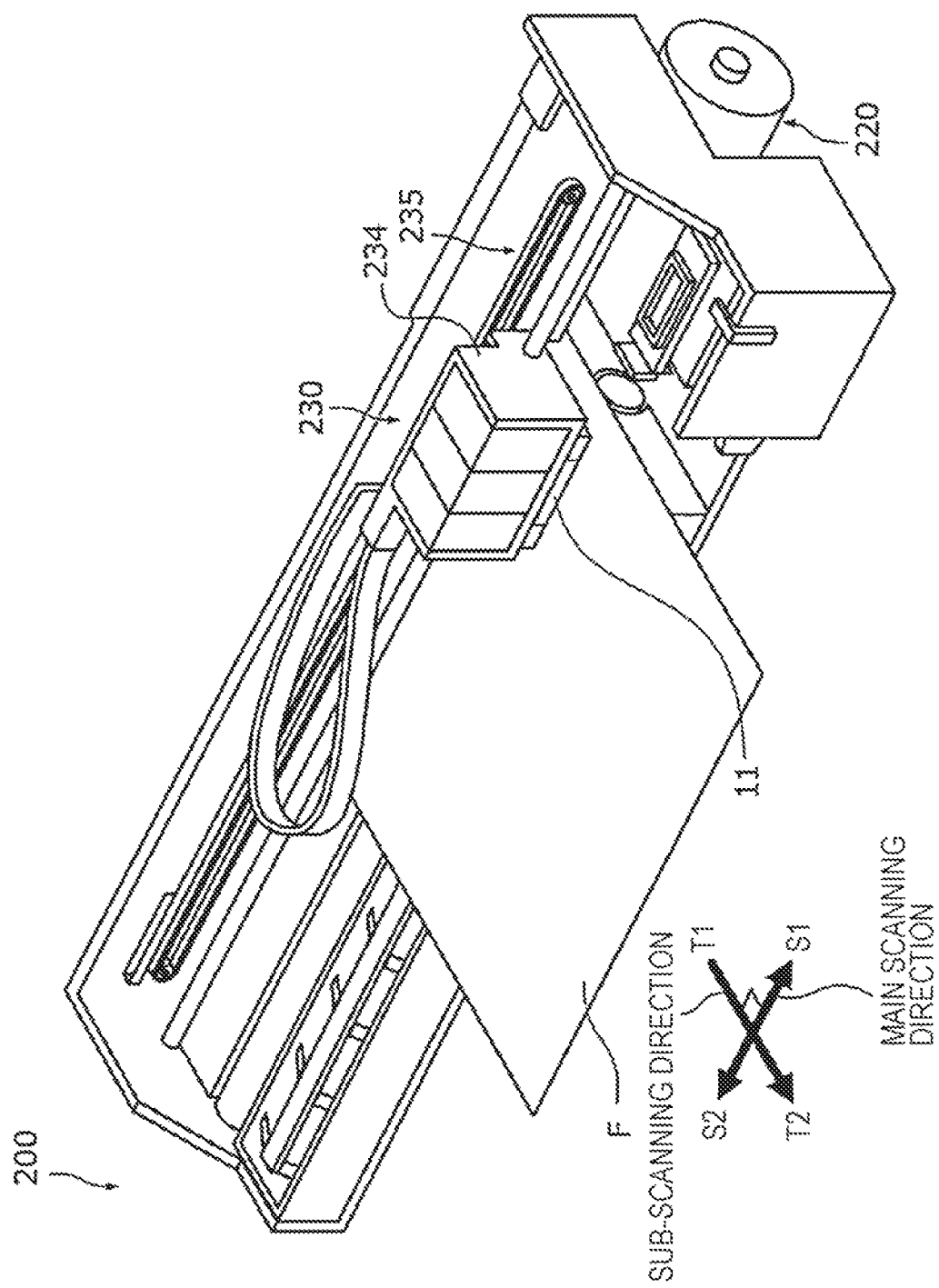

WHITE PIGMENT COMPOSITION AND RECORDED MATTER

The present application is based on, and claims priority from JP Application Serial Number 2020-054690, filed Mar. 25, 2020, the disclosure of which is hereby incorporated by reference herein in its entirety.

BACKGROUND

1. Technical Field

The present invention relates to a white pigment composition and a recorded matter.

2. Related Art

An ink jet recording method is capable of recording high-definition images by a relatively simple apparatus and is rapidly developed in various fields. In particular, various investigations are performed on improvements in sedimentation stability and whiteness of a white ink suitable for ink jet. For example, JP-A-. 2014-95058 discloses, as an ink for ink jet, an ink containing white pigment particles and hollow pigment particles having a cavity inside.

The ink jet ink described in JP-A-. 2014-95058 contains relatively large white pigment particles and has the problem of failing to sufficiently suppress sedimentation of the white pigment particles.

SUMMARY

A white pigment composition of the present invention contains titanium oxide having an average particle diameter $D_1$ of less than 100 nm and hollow particles having an average particle diameter $D_2$ of 100 nm or more.

A recorded matter of the present invention includes the white pigment composition adhering to a recording medium.

BRIEF DESCRIPTION OF THE DRAWING

FIGURE is a perspective view showing an example of a recording apparatus which can be used in an embodiment of the present invention.

DESCRIPTION OF EXEMPLARY EMBODIMENTS

An embodiment of the present invention (referred to as a "present embodiment" hereinafter) is described in detail below with reference to the drawing according to demand, but the present invention is not limited to this and can be variously modified within a range not deviating from the gist of the invention. In addition, a positional relation of the top, bottom, left, and right is based on the position relation shown in the drawing unless otherwise specified. Further, the dimensional ratio in the drawing is not limited to the ratio in the drawing.

1. White Pigment Composition

A white pigment composition according to the present embodiment contains titanium oxide having an average particle diameter $D_1$ of less than 100 nm and hollow particles having an average particle diameter $D_2$ of 100 nm or more, and if required, may contain inorganic oxide particles other than titanium oxide. The white pigment composition may further contain, as other components, water, an organic solvent, a surfactant, and a resin other than the above.

An inorganic white pigment such as titanium oxide or the like generally has a high specific gravity and thus tends to be easily sedimented. In addition, an organic white pigment having a relatively low specific gravity is hardly sedimented, but a recorded material is not considered to have high whiteness. In particular, there is a problem that a recorded matter loses whiteness and easily becomes transparent when wet.

On the other hand, the present embodiment suppresses sedimentation of an inorganic white pigment due to titanium oxide having an average particle diameter $D_1$ of less than 100 nm, and also uses the hollow particles having an average particle diameter $D_2$ of 100 nm or more. Thus, sedimentation hardly occurs, and it is possible to provide a recorded matter having excellent whiteness, particularly, a recorded matter which hardly loses whiteness even when wet. Each of the components is described in detail below.

1. 1. Titanium Oxide

The average particle diameter $D_1$ of titanium oxide is less than 100 nm, preferably 90 nm or less, more preferably 80 nm or less, still more preferably 70 nm or less, even still more preferably 65 nm or less, and yet even still more preferably 60 nm or less. The average particle diameter $D_1$ of titanium oxide having a relatively high specific gravity is less than 100 nm, thereby more suppressing the sedimentation of a dispersed component in the composition.

The average particle diameter $D_1$ of titanium oxide is preferably 5 nm or more, more preferably 15 nm or more, still more preferably 20 nm or more, even still more preferably 25 nm or more, and yet even still more preferably 30 nm or more. When the average particle diameter $D_1$ of titanium oxide is 5 nm or more, there is a tendency to improve the whiteness of the resultant recorded matter and to more suppress a decrease in whiteness when the resultant recorded matter is wet. In addition, whiteness of the recorded matter in the usual state of dry ink is also referred to as "dry whiteness" in order to distinguish from whiteness when wet.

In the present embodiment, the average particle diameter can be measured by a particle size distribution analyzer using a dynamic light scattering method as a measurement principle. An example of the particle size distribution analyzer is "zeta potential/particle size/molecular weight measurement system ELSZ2000ZS" (trade name) manufactured by Otsuka Electronics Co., Ltd. using a homodyne optical system as a frequency analysis method. In the present specification, the term "average particle diameter" represents a number-based average particle diameter unless otherwise specified.

The content of titanium oxide relative to the total amount of the composition is preferably 1.0% to 15% by mass, more preferably 3.0% to 12.5% by mass, and still more preferably 5.0% to 10% by mass. When the content of titanium oxide is within the range described above, there is a tendency to more suppress sedimentation of a dispersed component in the composition, more improve the dry whiteness of the resultant recorded matter, and more suppress a decrease in whiteness when the recorded matter is wet.

1. 2. Hollow Particle

The average particle diameter $D_2$ of the hollow particles is 100 nm or more, preferably 150 nm or more, more preferably 200 nm or more, still more preferably 250 nm or more, and even still more preferably 300 nm or more. When the average particle diameter $D_2$ of the hollow particles is 100 nm or more, the dry whiteness of the resultant recorded matter is more improved, and a decrease in whiteness is more suppressed when the resultant recorded matter is wet.

The average particle diameter $D_2$ of the hollow particles is preferably 1200 nm or less, more preferably 900 nm or less, still more preferably 700 nm or less, even still more preferably 600 nm or less, and yet even still more preferably 500 nm or less. When the average particle diameter $D_2$ of the hollow particles is 1200 nm or less, there is a tendency to more improve ejection stability and more suppress the sedimentation of the dispersed component in the composition. From the viewpoint of whiteness, the average particle diameter $D_2$ of the hollow particles is more preferably a particle diameter of 200 to 400 nm which is about a half of the visible light wavelength of 400 to 800 nm.

The ratio ($D_2/D_1$) of the average particle diameter $D_2$ of the hollow particles to the average particle diameter $D_1$ of titanium oxide is preferably 1.5 or more, more preferably 2 or more, still more preferably 5 or more, even still more preferably 7.5 or more, and yet even still more preferably 15 or more. With the ratio ($D_2/D_1$) of 1.5 or more, the composition contains the smaller titanium oxide and the larger hollow particles, thereby causing a tendency to more suppress the sedimentation of the dispersed component in the composition and more improve dry whiteness of the resultant recorded matter.

The ratio ($D_2/D_1$) is preferably 120 or less, more preferably 100 or less, still more preferably 80 or less, even still more preferably 60 or less, and yet even still more preferably 50 or less. With the ratio ($D_2/D_1$) of 120 or less, there is a tendency to suppress aggregation due to an excessive increase in a difference in particle diameter between the titanium oxide and hollow particles contained in the composition, to more improve the dry whiteness of the resultant recorded matter, and to more suppress a decrease in whiteness when the resultant recorded matter is wet.

The apparent specific gravity of the hollow particles is preferably 1.2 or less, more preferably 1.15 or less, still more preferably 1.1 or less, and even still more preferably 1.05 or less. When the apparent specific gravity of the hollow particles is 1.2 or less, there is a tendency to more suppress sedimentation of the dispersed component in the composition.

The apparent specific gravity of the hollow particles is preferably 0.7 or more, more preferably 0.75 or more, still more preferably 0.8 or more, even still more preferably 0.85 or more, and yet even still more preferably 0.9. When the apparent specific gravity of the hollow particles is 0.7 or more, the particle wall can be thickened, and breakage of the hollow structure can be more suppressed. Thus, the anti-sedimentation effect, which is expected from the hollow particles, tends to be suppressed from deteriorating due to breakage of the hollow structure. The apparent specific gravity can be adjusted by the volume of a cavity in the hollow particles.

The hollow particles are not particularly limited as long as they are particles having a cavity inside, and can be roughly divided into hollow resin particles and hollow metal particles according to the materials. Among these, the hollow resin particles are preferred. The hollow particles have a low specific gravity due to the material in addition to a small apparent specific gravity due to hollowness, and thus sedimentation of the dispersed component in the white pigment composition tends to be more suppressed.

Also, the combination of the hollow resin particles and the titanium oxide described above tends to more improve the whiteness of the resultant recorded matter. This is considered to be due to the phenomenon that when the hollow resin particles tending to have a relatively low refractive index is combined with the titanium oxide tending to have a relatively high refractive index, light scattering easily occurs due to the mixing of components having a large refractive index difference in the composition.

Further, the refractive indexes of the hollow resin particles and of inorganic particles such as silica or the like other than titanium oxide are relatively close to the refractive index of water, and thus the white pigment composition containing only the hollow resin particles and inorganic particles such as silica or the like other than titanium oxide easily causes deterioration in whiteness when wet. However, when the hollow particles are combined with the titanium oxide described above, whiteness can be maintained even when wet.

The hollow resin particles preferably contain a crosslinked resin. This can more suppress the breakage of the hollow structure. Therefore, the anti-sedimentation effect, which is expected from the hollow particles, tends to be suppressed from deteriorating due to the breakage of the hollow structure.

In addition, examples of the hollow metal particles include, but are not particularly limited to, silica, alumina, zirconia, titanium, and composite oxides thereof. These have an average particle diameter $D_2$ of 100 nm or more and are distinguished from the titanium oxide and inorganic oxide particles described later.

The content of the hollow particles relative to the total amount of the composition is preferably 1.0% to 15% by mass, more preferably 3.0% to 12.5% by mass, and still more preferably 5.0% to 10% by mass. When the content of the hollow particles is within the range described above, there is a tendency to more suppress the sedimentation of the dispersed component in the composition, more improve the dry whiteness of the resultant recorded matter, and more suppress a decrease in whiteness when the recorded matter is wet.

1. 3. Inorganic Oxide Particles

The white pigment composition of the present embodiment may further contain inorganic oxide particles having an average particle diameter $D_3$ of less than 100 nm as inorganic oxide particles other than titanium oxide. By containing the inorganic oxide particles, sedimentation of the dispersed component in the composition tends to be more suppressed.

The average particle diameter $D_3$ of the inorganic oxide particles is less than 100 nm, preferably 90 nm or less, more preferably 80 nm or less, still more preferably 70 nm or less, even still more preferably 65 nm or less, and yet even still more preferably 60 nm or less. The inorganic oxide particles having a relatively high specific gravity has an average particle diameter $D_3$ of less than 100 nm, and thus the sedimentation of the dispersed component in the composition tends to be more suppressed.

The average particle diameter $D_3$ of the inorganic oxide particles is preferably 5 nm or more, more preferably 15 nm or more, still more preferably 20 nm or more, even still more preferably 25 nm or more, and yet even still more preferably 30 nm or more. When the average particle diameter $D_3$ of the inorganic oxide particles is 5 nm or more, there is a tendency to more improve the dry whiteness of the resultant recorded matter and more suppress a decrease in whiteness when the resultant recorded matter is wet.

The inorganic oxide particles are not particularly limited, but, for example, one or more are selected from the group consisting of silica, alumina, zirconia, and composite oxides thereof. Among these, silica is more preferred. The use of such inorganic oxide particles tends to more improve the dry whiteness of the resultant recorded matter and to more suppress a decrease in whiteness when the recorded matter is wet.

The inorganic oxide particles are preferably hollow particles having a cavity inside. The use of the inorganic oxide particles tends to more suppress the sedimentation of the dispersed component in the composition.

The content of the inorganic oxide particles relative to the total amount of the composition is preferably 1.0% to 15% by mass, more preferably 3.0% to 12.5% by mass, and still more preferably 5.0% to 10% by mass. When the content of the inorganic oxide particles is within the range described above, there is a tendency to more suppress the sedimentation of the dispersed component in the composition, more improve the dry whiteness of the resultant recorded matter, and more suppress a decrease in whiteness when the recorded matter is wet.

1. 4. Resin

The white pigment composition of the present embodiment may further contain a resin other than the above. By containing the resin, the abrasion resistance of the resultant recorded matter tends to be more improved. The resin according to the present embodiment represents that not corresponding to the hollow resin particles.

The resin is, for example, a resin soluble in the white pigment composition or a resin dispersible in the form of resin particles or an emulsion. Using the resin tends to produce a recorded matter having excellent abrasion resistance.

Examples of the resin include, but are not particularly limited to, an acrylic resin, a vinyl acetate resin, a vinyl chloride resin, a butadiene resin, a styrene resin, a polyester resin, a crosslinked acrylic resin, a crosslinked styrene resin, a benzoguanamine resin, a phenol resin, a silicone resin, an epoxy resin, a urethane resin, a paraffin resin, a fluorocarbon resin, a water-soluble resin and a copolymer composed of a combination of monomers constituting these resins. Examples of a copolymer include, but are note particularly limited to, a styrene-butadiene resin and a styrene-acrylic resin. Also, a polymer latex containing any one of these resins can be used as the resin. The latex is, for example, a polymer latex containing fine particles of an acrylic resin, a styrene-acrylic resin, a styrene resin, a crosslinked acrylic resin, or a crosslinked styrene resin. These resins may be used alone or in combination of two or more. In particular, the resin particles contained in the white pigment composition of the present embodiment preferably contain at least one of an acrylic resin, a urethane resin, and a polyester resin.

The content of the resin relative to the total amount of the white pigment composition is preferably 1.0% by mass or more, more preferably 3.0% to 10.0% by mass, and still more preferably 3.0% to 8.0% by mass. The content of the resin within the range described above tends to more improve abrasion resistance.

1. 5. Water

The content of water relative to the total amount of the white pigment composition is preferably 55% to 85% by mass, more preferably 60% to 80% by mass, and still more preferably 65% to 75% by mass.

1. 6. Organic Solvent

Examples of the organic solvent include, but are not particularly limited to, glycol monoethers such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-tert-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, dipropylene glycol monobutyl ether, tetraethylene glycol monobutyl ether, and the like; glycol diethers such as diethylene glycol dimethyl ether, diethylene glycol diethyl ether, diethylene glycol dibutyl ether, diethylene glycol ethylmethyl ether, diethylene glycol butylmethyl ether, triethylene glycol dimethyl ether, tetraethylene glycol dimethyl ether, dipropylene glycol dimethyl ether, dipropylene glycol diethyl ether, tripropylene glycol dimethyl ether, and the like; nitrogen-containing solvents such as 2-pyrrolidone, N-methyl-2-pyrrolidone, N-ethyl-2-pyrrolidone, and the like; glycerin; glycols such as ethylene glycol, diethylene glycol, triethylene glycol, propylene glycol, dipropylene glycol, 1,3-propaneddiol, 1,2-butanediol, 1,2-pentanediol, 1,2-hexanediol, 1,4-butanediol, 1,5-pentanediol, 1,6-hexanediol, and the like; and alcohols such as methanol, ethanol, n-propyl alcohol, iso-propyl alcohol, n-butanol, 2-butanol, tert-butanol, iso-butanol, n-pentanol, 2-pentanol, 3-pentanol, tert-pentanol, and the like. Among these, propylene glycol, 2-pyrrolidone, 1,2-hexanediol, glycerin, and the like are preferred. The organic solvents may be used alone or in combination of two or more.

The content of the organic solvent relative to the total amount of the white pigment composition is preferably 2.5% to 17.5% by mass, more preferably 5% to 15% by mass, and still more preferably 7.5% to 12.5% by mass.

1. 7. Surfactant

Examples of the surfactant include, but are not particularly limited to, an acetylene glycol-based surfactant, a fluorine-based surfactant, and a silicone-based surfactant. Among these, an acetylene glycol-based surfactant is preferred. Using the surfactant tends to more improve wettability of the composition adhering to a recording medium.

The acetylene glycol-based surfactant is not particularly limited but is, for example, preferably one or more selected from 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyne-4-ol. Examples of a commercial product of the acetylene glycol-based surfactant include, but are not particularly limited to, Olfine 104 series and E series such as Olfine E1010 and the like (trade names manufactured by Air Products Japan, Inc.), and Surfynol 465 and Surfynol 61 (trade names manufactured by Nissin Chemical Industry Co., Ltd.). The acetylene glycol-based surfactants may be used alone or in combination of two or more.

Examples of the fluorine-based surfactant include, but are not particularly limited to, perfluoroalkylsulfonate salts, perfluoroalkylcarboxylate salts, perfluoroalkylphosphate ester, perfluoroalkyl ethylene oxide adducts, perfluoroalkyl betaines, and perfluoroalkylamine oxide compounds. Examples of a commercial product of the fluorine-based surfactant include, but are not particularly limited to, S-144 and S-145 (manufactured by AGC Inc.); FC-170C, FC-430, and Fluorad-FC4430 (manufactured by Sumitomo 3M Limited); FSO, FSO-100, FSN, FSN-100, and FS-300 (manufactured by Dupont Corporation); and FT-250 and 251 (manufactured by Neos Co., Ltd.). The fluorine-based surfactants may be used alone or in combination of two or more.

Examples of the silicone-based surfactant include, but are not particularly limited to, a polysiloxane-based compound, polyether-modified organosiloxane, and the like. Examples of a commercial product of the silicone-based surfactant include, but are not particularly limited to, BYK-306, BYK-307, BYK-333, BYK-341, BYK-345, BYK-346, BYK-347, BYK-348, and BYK-349 (trade names, manufactured by BYK Chemie Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names manufactured by Shin-Etsu Chemical Co., Ltd.), and the like.

The content of the surfactant relative to the total amount of the white pigment composition is preferably 0.1% to 5% by mass and more preferably 0.1% to 3% by mass.

2. Recording Method

A recording method using the white pigment composition of the present embodiment is, for example, a method including adhering the white pigment composition to a recording medium by ejecting from an ink jet head and, if required, drying the white pigment composition adhered to the recording medium.

2. 1. Adhesion

The white pigment composition is adhered to a recording medium by ejecting from an ink jet head. FIG. 1 is a perspective view of a serial printer as an example of a recording apparatus used in the recording method of the present embodiment. As shown in FIG. 1, a serial printer 200 includes a transporting portion 220 and a recording portion 230. The transporting portion 220 transports a recording medium F, which has been fed to the serial printer, to the recording portion 230 and, after recording, discharges the recording medium F to the outside of the serial printer. Specifically, the transporting portion 220 includes feeding rollers and transports the fed recording medium F in a sub-scanning directions T1-T2.

The recording portion 230 includes an ink jet head 11 which ejects a composition to the recording medium F transported from the transporting portion 220, a carriage 234 equipped with the ink jet head 11, and a carriage moving mechanism 235 which moves the carriage 234 in a main scanning direction S1-S2 of the recording medium F.

Examples of the recording medium used in the present embodiment include, but are not particularly limited to, an absorbent recording medium and a low-absorbent or non-absorbent recording medium.

Examples of the absorbent recording medium include, but are not particularly limited to, plain paper such as electrophotographic paper having high ink permeability and the like, ink jet paper (paper exclusive for ink jet, having an absorbing layer composed of silica particles or alumina particles or an absorbing layer composed of a hydrophilic polymer such as polyvinyl alcohol (PVA), polyvinylpyrrolidone (PVP), or the like), fabric, and the like.

Examples of the low-absorbent recording medium include, but are not particularly limited to, art paper, coated paper, cast paper, and the like, which have relatively low ink permeability and are used for general offset printing. These are provided with a coating layer having relatively low ink permeability and are referred to as "coated paper". The coated layer is a layer composed of a resin, an inorganic compound, or the like with low water absorption and a layer with low ink absorption.

Examples of the non-absorbent recording medium include, but are not particularly limited to, films and plates of plastics such as polyvinyl chloride, polyethylene, polypropylene, polyethylene terephthalate (PET), polycarbonate, polystyrene, polyurethane, and the like; plates of metals such as iron, silver, copper, aluminum, and the like; metal plates and plastic films produced by vapor deposition of these metals; plates of alloys such as stainless, brass, and the like; recording media each including a paper-made substrate on which a film of plastic such as polyvinyl chloride, polyethylene, polypropylene, polyethylene terephthalate (PET), polycarbonate, polystyrene, polyurethane, or the like is bonded (coated); and the like.

2. 2. Drying

The white pigment composition on the recording medium is dried by heating the recording medium. Examples of a heating unit for heating the recording medium include, but are not particularly limited to, a platen heater, a hot-wind heater, an IR heater, and the like, which are provided with a heating function, a blower not provided with a heating function, and the like.

3. Recorded Matter

The recorded matter of the present embodiment includes the white pigment composition adhered to the recording medium. More specifically, the recorded matter is produced by the recording method described above.

EXAMPLES

The present invention is more specifically described below by using examples and comparative examples. The present invention is not limited to these examples below.

1. White Pigment Composition

Components were placed in a tank for a mixture so as to provide compositions described in Table 1, mixed and stirred, and further filtered with a 5-μm membrane filter, preparing a white pigment composition of each of the examples. The numerical value of each of the components shown in each of the examples in Table 1 is expressed by % by mass unless otherwise specified. In Table 1, the numerical value of a pigment dispersion is expressed by % by mass of a solid content.

The abbreviates and product names used in Table 1 are as follows. All average particle diameters were values measured by "zeta potential/particle size/molecular weight measurement system ELSZ2000ZS" manufactured by Otsuka Electronics Co., Ltd.

[Titanium Oxide]
Titanium oxide A (manufactured by Tayca Corporation, product name MT05, $D_1$: 10 nm)
Titanium oxide B (manufactured by Tayca Corporation, product name MT100WP, $D_1$: 20 nm)
Titanium oxide C (manufactured by Tayca Corporation, product name MT600B, $D_1$: 50 nm)
Titanium oxide D (manufactured by Ishihara Sangyo Kaisha, Ltd., product name MPT140, $D_1$: 69 nm)
Titanium oxide E (manufactured by Ishihara Sangyo Kaisha, Ltd., product name MPT141, $D_1$: 90 nm)
Titanium oxide F (manufactured by Tayca Corporation, produce name JA1, $D_1$: 180 nm)

[Hollow Particles]
The hollow resin particles A to F used were composed of styrene acrylic resin manufactured by Saiden Chemical Industry Co., Ltd and had $D_2$ of 80 nm, 100 nm, 200 nm, 400 nm, 790 nm, and 1000 nm, respectively.

The hollow metal particles A to C used were nano hollow silica particles manufactured by KRI, Inc. and had $D_2$ of 200 nm, 300 nm, and 400 nm, respectively.

[Inorganic Oxide Particles]
The inorganic oxide particles A to E used were composed of colloidal silica manufactured by Nissan Chemical Corporation, Snowtech Series XS ($D_3$: 3 nm), 50T ($D_3$: 20 nm), 30L ($D_3$: 50 nm), ZL ($D_3$: 69 nm), and MP1040 ($D_3$: 90 nm), respectively.

[Organic Solvent]
1.2-Hexanediol
Glycerin
2-Pyrrolidone

[Surfactant]
Olfine E1010 (manufactured by Air Products Japan, Inc., acetylene glycol-based surfactant)

[Resin]
Styrene-acrylic resin (manufactured by Mitsui Chemicals, Inc., Bonron 51120)

1. 1. Method for Measuring Average Particle Diameter

The average particle diameter was measured by "zeta potential/particle size/molecular weight measurement system ELSZ2000ZS" manufacture by Otsuka Electronics Co., Ltd.

2. Evaluation Method 2. 1. Dry Whiteness

An ink cartridge of PX-S860 manufactured by Epson Corporation was filled with the white pigment composition, and a white solid pattern was formed on a recording medium (PET film (A-one OHP film, A4 size for PPC) with a resolution of 600×600 dpi and an ink adhesion amount of 14 mg/inch². The whiteness (L*) of the resultant pattern was measured by spectrophotometer Gretag Macbeth Spectrolino (product name, manufactured by X-RITE, Inc.). During measurement, a black mount with an OD value of 2.1 was used as a base. Based on the measured values, whiteness was evaluated according to the following evaluation criteria.

(Evaluation Criteria)
A: L value of 75 or more
B: L value of 70 or more and less than 75
C: L value of 60 or more and less than 70
D: L value of 50 or more and less than 60
E: L value of 40 or more and less than 50
F: L value of less than 40

2. 2. Wet Whiteness

Water droplets were put on the white pattern formed as described above and, after the elapse of 1 minute, the water droplets were wiped off. Then, the whiteness of the white pattern in a wet state was visually observed, and based on the observation evaluation, the wet whiteness was evaluated according to the following evaluation criteria.

(Evaluation Criteria)
A: The white pattern has whiteness in the same degree as before wetting.
B: The white pattern has whiteness lower as compared with before wetting, but is not semi-transparent.
C: The white pattern becomes semi-transparent by wetting.
D: The white pattern becomes close to transparent by wetting.
E: The white pattern becomes transparent by wetting.

2. 3. Sedimentation Property

The white pigment composition was stored at 25° C. for 1 month. Then, a supernatant portion of the white pigment composition was recognized, and the sedimentation property was evaluated according to the following evaluation criteria.

(Evaluation Criteria)
A: The supernatant has no transparent portion.
B: The supernatant has a transparent layer having a thickness of over 0 mm and 3 mm or less.
C: The supernatant has a transparent layer having a thickness of over 3 mm and 5 mm or less.
D: The supernatant has a transparent layer having a thickness of over 5 mm and 10 mm or less.
E: The supernatant has a transparent layer having a thickness of over 10 mm and 20 mm or less.

2. 4. Abrasion Resistance

A printed matter was heated at 70° C. for 1 minute and then evaluated by rubbing three times with an eraser, MONO (trade name of Tombow Pencil Co., Ltd.).

(Evaluation Criteria)
A: The image is not disturbed.
B: The image is disturbed.

TABLE 1

|  |  | Average particle diameter | Example | | | | | | | | | Comparative Example | | | |
| --- | --- | --- | --- | --- | --- | --- | --- | --- | --- | --- | --- | --- | --- | --- | --- |
|  |  |  | 1 | 2 | 3 | 4 | 5 | 6 | 7 | 8 | 9 | 1 | 2 | 3 | 4 |
| Titanium oxide | Titanium oxide A | 10 nm | 7.0 |  |  |  |  | 7.0 |  |  |  |  |  |  |  |
|  | Titanium oxide B | 20 nm |  | 7.0 |  |  |  |  | 7.0 |  |  |  |  |  |  |
|  | Titanium oxide C | 50 nm |  |  | 7.0 |  |  |  |  | 7.0 |  |  | 7.0 |  |  |
|  | Titanium oxide D | 69 nm |  |  |  | 7.0 |  |  |  |  | 7.0 |  |  |  | 7.0 |
|  | Titanium oxide E | 90 nm |  |  |  |  | 7.0 |  |  |  |  |  |  |  |  |
|  | Titanium oxide F | 180 nm |  |  |  |  |  |  |  |  |  | 7.0 |  |  |  |
| Hollow particle | Hollow resin particle A | 80 nm |  |  |  |  |  |  |  |  |  |  | 7.0 |  |  |
|  | Hollow resin particle B | 100 nm |  |  |  |  |  | 7.0 |  |  |  |  |  |  |  |
|  | Hollow resin particle C | 200 nm |  |  |  | 7.0 |  |  |  |  |  |  |  |  |  |
|  | Hollow resin particle D | 400 nm |  |  | 7.0 |  |  |  |  |  | 7.0 |  |  | 7.0 |  |
|  | Hollow resin particle E | 790 nm |  | 7.0 |  |  |  |  |  |  |  |  |  |  |  |
|  | Hollow resin particle F | 1000 nm | 7.0 |  |  |  |  |  |  | 7.0 |  |  |  |  |  |
|  | Hollow metal particle A | 200 nm |  |  |  |  |  |  | 7.0 |  |  |  |  |  |  |
|  | Hollow metal particle B | 300 nm |  |  |  |  |  |  |  | 7.0 |  |  |  |  |  |
|  | Hollow metal particle C | 400 nm |  |  |  |  |  | 7.0 |  |  |  |  |  |  |  |
| Inorganic oxide particle | Inorganic oxide particle A | 3 nm | 7.0 |  |  |  |  |  |  |  |  | 7.0 |  |  |  |
|  | Inorganic oxide particle B | 20 nm |  | 7.0 |  |  |  |  |  | 7.0 |  |  |  |  |  |
|  | Inorganic oxide particle C | 50 nm |  |  | 7.0 |  |  |  | 7.0 |  |  |  |  | 7.0 | 7.0 |
|  | Inorganic oxide particle D | 69 nm |  |  |  | 7.0 |  | 7.0 |  |  |  |  |  |  |  |
|  | Inorganic oxide particle E | 90 nm |  |  |  |  | 7.0 |  |  |  |  |  |  |  |  |
| Organic solvent | 1,2-Hexanediol |  | 2.0 | 2.0 | 2.0 | 2.0 | 2.0 | 2.0 | 2.0 | 2.0 | 2.0 | 2.0 | 2.0 | 2.0 | 2.0 |
|  | Glycerin |  | 5.0 | 5.0 | 5.0 | 5.0 | 5.0 | 5.0 | 5.0 | 5.0 | 5.0 | 5.0 | 5.0 | 5.0 | 5.0 |
|  | 2-Pyrrolidone |  | 2.0 | 2.0 | 2.0 | 2.0 | 2.0 | 2.0 | 2.0 | 2.0 | 2.0 | 2.0 | 2.0 | 2.0 | 2.0 |
| Resin | Styrene-acrylic resin |  | 4.0 | 4.0 | 4.0 | 4.0 |  | 4.0 | 4.0 | 4.0 |  |  |  |  |  |
| Surfactant | Olfine E1010 |  | 1.0 | 1.0 | 1.0 | 1.0 | 1.0 | 1.0 | 1.0 | 1.0 | 1.0 | 1.0 | 1.0 | 1.0 | 1.0 |
|  | Water |  | 69 | 69 | 69 | 69 | 69 | 69 | 69 | 69 | 76 | 69 | 69 | 76 | 76 |

TABLE 1-continued

| | Average particle diameter | Example | | | | | | | | | Comparative Example | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Evaluation result | Dry whiteness | B | A | A | A | B | B | A | A | A | A | E | E | F |
| | Wet whiteness | B | A | A | A | A | B | A | A | A | B | D | E | D |
| | Sedimentation property | B | A | A | A | B | B | A | A | B | E | B | B | B |
| | Abrasion resistance | A | A | A | A | B | A | A | A | B | B | B | B | B |

What is claimed is:

1. A white pigment composition comprising:
   titanium oxide having an average particle diameter $D_1$ of less than 100 nm;
   hollow particles having an average particle diameter $D_2$ of 100 nm or more: and
   inorganic oxide particles having an average particle diameter $D_3$ of less than 100 nm,
   wherein the inorganic oxide particles have a cavity inside.

2. The white pigment composition according to claim 1, wherein the ratio ($D_2/D_1$) of the average diameter $D_2$ of the hollow particles to the average diameter $D_1$ of the titanium oxide is 2 or more and 100 or less.

3. The white pigment composition according to claim 1, wherein the apparent specific gravity of the hollow particles is 1.2 or less.

4. The white pigment composition according to claim 1, wherein the hollow particles are hollow resin particles.

5. The white pigment composition according to claim 4, wherein the hollow resin particles contain a crosslinked resin.

6. The white pigment composition according to claim 1, wherein the white pigment composition further comprises resin.

7. The white pigment composition according to claim 1, wherein the average particle diameter $D_1$ of the titanium oxide is 20 nm or more and 70 nm or less.

8. The white pigment composition according to claim 1, wherein the average particle diameter $D_2$ of the hollow particles is 200 nm or more and 700 nm or less.

9. The white pigment composition according to claim 1, wherein the inorganic oxide particles contain one or more selected from the group consisting of silica, alumina, zirconia, a composite oxide thereof.

10. The white pigment composition according to claim 1, wherein the average particle diameter $D_3$ of the inorganic oxide particles is 20 nm or more and 70 nm or less.

11. A recorded matter comprising the white pigment composition according to claim 1, adhering to a recording medium.

* * * * *